(12) United States Patent
Mulfinger (10) Patent No.: US 8,944,838 B2
(45) Date of Patent: Feb. 3, 2015

(54) CONNECTOR WITH LOCKING RING

(71) Applicant: Tyco Electronics Corporation, Berwyn, PA (US)

(72) Inventor: Robert Neil Mulfinger, York Haven, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 106 days.

(21) Appl. No.: 13/860,447

(22) Filed: Apr. 10, 2013

(65) Prior Publication Data

US 2014/0308009 A1     Oct. 16, 2014

(51) Int. Cl.
*H01R 13/627* (2006.01)
*G02B 6/38* (2006.01)

(52) U.S. Cl.
CPC .......... *G02B 6/3893* (2013.01); *H01R 13/6277* (2013.01)
USPC .......................................... 439/352; 439/349

(58) Field of Classification Search
USPC ................................................ 439/352, 349
See application file for complete search history.

(56) References Cited

U.S. PATENT DOCUMENTS

| | | | |
|---|---|---|---|
| 3,508,188 A | | 4/1970 | Buck |
| 3,569,903 A | * | 3/1971 | Brishka .......................... 439/352 |
| 4,088,549 A | | 5/1978 | Deuber et al. |
| 4,126,524 A | | 11/1978 | Hradil et al. |
| 4,478,691 A | | 10/1984 | Abys |
| 5,176,533 A | * | 1/1993 | Sakurai et al. ................. 439/352 |
| 5,179,235 A | | 1/1993 | Toole |
| 5,195,904 A | * | 3/1993 | Cyvoct ........................... 439/349 |
| 5,318,457 A | * | 6/1994 | Harting et al. ................. 439/352 |
| 5,434,091 A | | 7/1995 | Hill et al. |
| 5,557,872 A | | 9/1996 | Langner |
| 5,595,499 A | * | 1/1997 | Zander et al. .................. 439/352 |
| 5,637,010 A | * | 6/1997 | Jost et al. ....................... 439/352 |

(Continued)

FOREIGN PATENT DOCUMENTS

| | | |
|---|---|---|
| EP | 2139012 | 12/2009 |
| GB | 1234793 | 6/1971 |

(Continued)

OTHER PUBLICATIONS http://tworxventures.com/images/pds/110527_tpr_brochure_web.pdf, with more information http://tworxventures.com/technology.

(Continued)

*Primary Examiner* — Ross Gushi (57) ABSTRACT

A connector is provided for mating with a mating connector. The connector includes a housing having an internal compartment and a locking segment. A contact is held within the internal compartment of the housing. A locking ring extends around the housing. The locking ring has a latch that is configured to cooperate with a latch member of the mating connector to lock the connector and the mating connector together. The connector includes a first actuator configured to compress the locking ring radially inward or expand the locking ring radially outward to release the latch of the locking ring from the latch member of the mating connector. The locking segment of the housing includes a second actuator that is configured to compress the locking ring radially inward or expand the locking ring radially outward to release the latch of the locking ring from the latch member of the mating connector.

20 Claims, 3 Drawing Sheets

(56) References Cited

U.S. PATENT DOCUMENTS

| | | | |
|---|---|---|---|
| 5,704,153 A | 1/1998 | Kaminski et al. | |
| 5,706,600 A | 1/1998 | Toole et al. | |
| 5,785,545 A * | 7/1998 | Holt | 439/352 |
| 6,142,812 A * | 11/2000 | Hwang | 439/352 |
| 6,267,612 B1 * | 7/2001 | Arcykiewicz et al. | 439/253 |
| 6,434,875 B1 | 8/2002 | Constant et al. | |
| 6,645,011 B2 * | 11/2003 | Schneider et al. | 439/607.17 |
| 6,671,991 B1 | 1/2004 | Danielson | |
| 6,692,286 B1 * | 2/2004 | De Cet | 439/352 |
| 6,695,636 B2 * | 2/2004 | Hall et al. | 439/352 |
| 6,709,289 B2 * | 3/2004 | Huber et al. | 439/578 |
| 6,848,931 B2 * | 2/2005 | McMullen et al. | 439/350 |
| 6,884,105 B2 * | 4/2005 | Turck et al. | 439/352 |
| 7,189,113 B2 * | 3/2007 | Sattele et al. | 439/578 |
| 7,238,047 B2 * | 7/2007 | Saettele et al. | 439/578 |
| 7,260,910 B2 | 8/2007 | Danielson | |
| 7,322,846 B2 * | 1/2008 | Camelio | 439/352 |
| 7,351,088 B1 * | 4/2008 | Qu | 439/352 |
| 7,510,432 B2 * | 3/2009 | Entsfellner | 439/578 |
| 7,513,788 B2 * | 4/2009 | Camelio | 439/352 |
| 7,553,185 B1 * | 6/2009 | Qu et al. | 439/578 |
| 7,568,934 B1 * | 8/2009 | Williams et al. | 439/271 |
| 7,627,975 B1 | 12/2009 | Hines | |
| 7,669,359 B2 | 3/2010 | Kim | |
| 7,695,302 B2 * | 4/2010 | Eissner et al. | 439/352 |
| 7,722,379 B2 * | 5/2010 | Yang et al. | 439/352 |
| 7,743,547 B2 | 6/2010 | Houde-Walter | |
| 7,758,370 B1 * | 7/2010 | Flaherty | 439/352 |
| 7,785,129 B2 * | 8/2010 | Chen | 439/352 |
| 7,789,667 B2 * | 9/2010 | Zhu et al. | 439/39 |
| 7,857,651 B2 * | 12/2010 | Chen | 439/352 |
| 7,887,365 B1 * | 2/2011 | Orner et al. | 439/585 |
| 7,892,004 B2 * | 2/2011 | Hertzler et al. | 439/312 |
| 7,975,419 B2 | 7/2011 | Darlan | |
| 8,006,428 B2 | 8/2011 | Moore et al. | |
| 8,021,181 B2 * | 9/2011 | Montena et al. | 439/352 |
| 8,087,954 B2 * | 1/2012 | Fuchs | 439/578 |
| 8,091,265 B1 | 1/2012 | Teetzel et al. | |
| 8,091,267 B2 | 1/2012 | Moore et al. | |
| 8,104,211 B2 | 1/2012 | Darian | |
| 8,491,333 B2 * | 7/2013 | Evans | 439/578 |
| 8,496,495 B2 * | 7/2013 | Kari | 439/352 |
| 2003/0027435 A1 * | 2/2003 | Schneider et al. | 439/63 |
| 2003/0139081 A1 * | 7/2003 | Hall et al. | 439/352 |
| 2003/0153210 A1 * | 8/2003 | Huber et al. | 439/578 |
| 2004/0014350 A1 * | 1/2004 | McMullen et al. | 439/350 |
| 2010/0083553 A1 | 4/2010 | Montgomery | |
| 2010/0192443 A1 | 8/2010 | Cabahug et al. | |
| 2010/0275489 A1 | 11/2010 | Cabahug et al. | |
| 2011/0061284 A1 | 3/2011 | Cabahug et al. | |
| 2011/0154712 A1 | 6/2011 | Moore et al. | |
| 2011/0157388 A1 | 6/2011 | Liu | |

FOREIGN PATENT DOCUMENTS

| | | |
|---|---|---|
| GB | 1294601 | 11/1972 |
| GB | 2264201 | 8/1993 |
| WO | WO93/06993 | 4/1993 |
| WO | WO9429664 | 12/1994 |
| WO | WO2010853436 | 5/2010 |
| WO | WO2011/085295 | 7/2011 |
| WO | WO2011/085464 | 7/2011 |

OTHER PUBLICATIONS

International Search Report, International Application No. PCT/US2012/046008, International Filing Date Jul. 10, 2010.

Annex to European Search Report, Mail Date, Mar. 14, 2013, EP13153303, Application No. 13153303.6-1801.

* cited by examiner

CONNECTOR WITH LOCKING RING

BACKGROUND OF THE INVENTION

The subject matter described and/or illustrated herein relates generally to connectors, such as, but not limited to, electrical connectors, optical connectors, and/or the like.

Many connector assemblies include a lock that holds a pair of complementary connectors together in a mated state. The lock may include a release mechanism that unlocks the lock to enable the complementary connectors to be released (i.e., unmated, disconnected, etc.) from each other, for example by being pulled apart from each other. One example of such a release feature is a collar that extends around one or both of the connectors and is pulled or pushed to unlock the lock. But, some known locks may hold the complementary connectors together even when the connector assembly experiences a disconnection force that is large enough to cause damage to nearby persons, the connectors, and/or components terminated by, mounted to, and/or interconnected by the connectors. For example, snagging or pulling of a cable that is terminated by one of the connectors may exert a disconnection force on the mated connectors that acts to disconnect the connectors from each other. Some known locks may be capable of holding the connectors together even when the disconnection force is large enough to damage (e.g., tear, fracture, bend, kink, injure, maim, and/or the like) the cable, the connectors, and/or nearby persons.

"Break-free" connector assemblies have been introduced to reduce or prevent damage. Specifically, the locks of break-free connector assemblies are designed to unlock or break-apart when the mated connectors experience a disconnection force that may be large enough to cause damage. Accordingly, the connectors of break-free connector assemblies will disconnect (i.e., break-free) from each other when exposed to a potentially damaging disconnection force. The locks of some known break-free connector assemblies include canted coil springs and/or snap rings that enable the connectors to break-free from each other. But, canted coil springs and/or snap rings may be prone to mechanically failing and/or becoming contaminated with dirt, mud, moisture, dust, corrosion, and/or other debris. Such mechanical failure and/or contamination may reduce or eliminate the ability of the connectors to break-free from each other and/or may reduce or eliminate the ability of the lock to hold the connectors together. Other known break-free connector assemblies include locks that use an interference fit between the connectors, which are sometimes referred to as "friction fit style" break-free connector assemblies. But, friction fit style break-free connector assemblies may be susceptible to vibration. For example, the interference fit between the connectors may vibrate loose such that the connectors unintentionally break-free from each other. Accordingly, known break-free connector assemblies may be unreliable.

BRIEF DESCRIPTION OF THE INVENTION

In one embodiment, a connector is provided for mating with a mating connector. The connector includes a housing having an internal compartment and a locking segment. A contact is held within the internal compartment of the housing. A locking ring extends around the housing. The locking ring has a latch that is configured to cooperate with a latch member of the mating connector to lock the connector and the mating connector together. The connector includes a first actuator configured to compress the locking ring radially inward or expand the locking ring radially outward to release the latch of the locking ring from the latch member of the mating connector. The locking segment of the housing includes a second actuator that is configured to compress the locking ring radially inward or expand the locking ring radially outward to release the latch of the locking ring from the latch member of the mating connector.

In another embodiment, a connector assembly includes a mating connector having a latch member, and a connector. The connector includes a housing having an internal compartment and a locking segment, a contact held within the internal compartment of the housing, and a locking ring extends around the housing. The locking ring has a latch that is configured to cooperate with the latch member of the mating connector to lock the connector and the mating connector together. The connector includes a first actuator configured to compress the locking ring radially inward to release the latch of the locking ring from the latch member of the mating connector. The locking segment of the housing includes a second actuator that is configured to compress the locking ring radially inward to release the latch of the locking ring from the latch member of the mating connector.

In another embodiment, a connector assembly includes a cable extending along a central longitudinal axis and having an end, and a connector terminating the end of the cable. The connector includes a housing having an internal compartment and a locking segment. The locking segment is mechanically connected to the cable. A contact is held within the internal compartment of the housing. A locking ring extends around the housing. The locking ring has a latch that is configured to cooperate with a latch member of a mating connector to lock the connector and the mating connector together. The connector includes a first actuator configured to compress the locking ring radially inward or expand the locking ring radially outward to release the latch of the locking ring from the latch member of the mating connector. The locking segment of the housing includes a second actuator that is configured to compress the locking ring radially inward or expand the locking ring radially outward when the cable is pulled along the central longitudinal axis to release the latch of the locking ring from the latch member of the mating connector. The second actuator is configured to release the latch of the locking ring from the latch member of the mating connector independently of the first actuator.

DETAILED DESCRIPTION OF THE INVENTION

Figure 1:
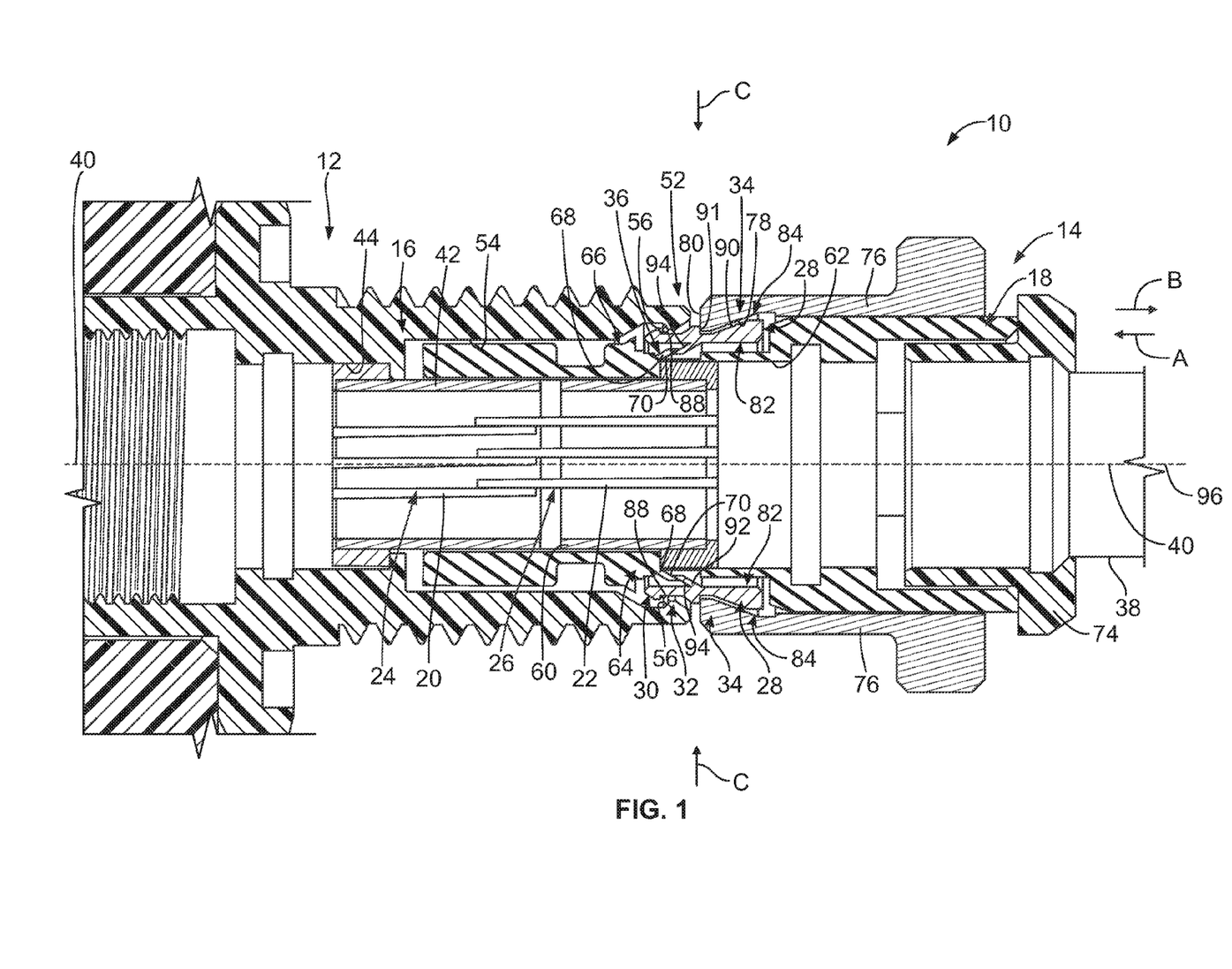
FIG. 1 is a cross-sectional view of an exemplary embodiment of a connector assembly.

FIG. 1 is a perspective view illustrating a cross section of an exemplary embodiment of a connector assembly 10. The connector assembly 10 includes a pair of connectors 12 and 14 that mate together to establish a connection (e.g., an electrical connection, optical connection, an inductive connection, and/or the like) therebetween. The connectors mate together along a connection axis 40. Each of the connectors 12 and 14 includes a respective housing 16 and 18 that holds one or more contacts 20 and 22, respectively. When the connectors 12 and 14 are mated together, mating segments 24 of the contacts 20 engage mating segments 26 of the contacts 22 to interconnect the electrical connectors 12 and 14. The connection axis 40 may be referred to herein as "central longitudinal axis" of the housing 18.

The connector assembly 10 may be used as a component of a wide variety of systems and to interconnect a wide variety of electrical components. For example, the connector assembly 10 may be used as a component of a weapon (e.g., the weapon 200 shown in FIG. 4) for interconnecting various electrical components of the weapon. But, the connector assembly 10 is not limited to being used with weapons. Rather, the connector assembly 10 may be used to interconnect any electrical components and may be used as a component of any other device, structure, machine, component, system, and/or the like in addition or alternative to a weapon, such as, but not limited to, a communications system, an electrical power system, and/or the like. Each of the connectors 12 and 14 may be referred to herein as a "mating connector".

In the illustrated embodiment, the connector 14 includes a locking ring 28 that defines a component of a lock of the connector assembly 10. The lock of the connector assembly 10 holds the connectors 12 and 14 together in a mated state. The locking ring 28 includes a latch 30 that cooperates with a latch member 32 of the connector 12 to lock the connectors 12 and 14 together. An actuator 34 is provided for unlocking the latch 30 and thereby enabling the connectors 12 and 14 to be unmated from each other. Specifically, the actuator 34 releases the latch 30 from the latch member 32 to thereby enable the connectors 12 and 14 to be unmated. As will be described below, the connector assembly 10 includes another actuator 36 that is capable of unlocking the latch 30 independently of the actuator 34. Specifically, the actuator 36 is configured to release the latch 30 from the latch member 32 independently of the actuator 34. As will also be described below, the actuator 36 may be configured to release the latch 30 from the latch member 32 when a cable 38 terminated by the connector 12 or 14 is pulled. The actuator 34 may be referred to herein as a "first actuator". The actuator 36 may be referred to herein as a "second actuator".

The connector 12 includes extends along the connection axis 40 and includes the housing 16, an optional insert 42 (e.g., a dielectric insert and/or the like), and the contacts 20. The housing 16 includes an internal compartment 44 wherein the insert 42 is held. In the exemplary embodiment, the contacts 20 of the connector 12 are held by the insert 42. Each contact 20 includes the mating segment 24. Each contact 20 may be any type of contact, such as, but not limited to, a signal contact, a ground contact, an electrical power contact, an optical contact, an inductive contact, and/or the like. The connector 12 may include any number of the contacts 20. Each mating segment 24 may additionally or alternatively include any other structure, type of contact, and/or the like than is shown herein, such as, but not limited to, a receptacle, a spring, a pin, an arm, a tab, a pad, and/or the like.

The housing 16 of the connector 12 extends to an end 52. The end 52 of the housing 16 includes the latch member 32. The latch member 32 extends along a radially (relative to the connection axis 40) inner wall 54 of the housing 16 in the exemplary embodiment. In the exemplary embodiment, the latch member 32 includes a latch shoulder 56 that is angled obliquely relative to the connection axis 40. The latch shoulder 56 may have any angle (whether or not the angle is oblique) relative to the connection axis 40 that enables the latch shoulder 56 to cooperate with the latch 30 to lock the connectors 12 and 14 together. For example, the angle of the latch shoulder 56 may be approximately perpendicular to the connection axis 40 in other embodiments. The latch member 32 is not limited to the latch shoulder 56, but may additionally or alternatively include any other structure that enables the latch member 32 to cooperate with the latch 30 to lock the connectors 12 and 14 together.

Any device, structure, and/or the like may be terminated by, mounted to, and/or connected with the connector 12. In some embodiments, the connector 12 terminates a cable (not shown).

The connector 14 includes extends along the connection axis 40 and includes the housing 18, an optional insert 60 (e.g., a dielectric insert and/or the like), and the contacts 22. The insert 60 is held within an internal compartment 62 of the housing 18. In the exemplary embodiment, the contacts 22 of the connector 14 are held by the insert 60. Each contact 22 includes the mating segment 26 and may be any type of contact, such as, but not limited to, a signal contact, a ground contact, an electrical power contact, an optical contact, an inductive contact, and/or the like. The connector 14 may include any number of the contacts 22. Each mating segment 26 may additionally or alternatively include any other structure, type of contact, and/or the like than is shown herein, such as, but not limited to, a spring, a pin, a receptacle, an arm, a tab, a pad, and/or the like.

The housing 18 of the connector 14 extends a length along the connection axis 40 and includes a locking segment 64. The locking segment 64 extends around the insert 60 and includes a radially (relative to the connection axis 40) outer side 66. The locking segment 64 includes the actuator 36. In the exemplary embodiment, the actuator 36 includes an actuator projection 68 that extends outward on the radially outer side 66 of the locking segment 64.

The actuator projection 68 includes an actuator ramp 70 that is configured to cooperate with the locking ring 28 to release the latch 30 from the latch member 32, as will be described below. The actuator ramp 70 is angled obliquely relative to the connection axis 40. The actuator ramp 70 may have any oblique angle relative to the connection axis 40 that enables the actuator ramp 70 to cooperate with the locking ring 28 to release the latch 30 from the latch member 32. Moreover, the actuator 36 is not limited to the actuator projection 68 and/the actuator ramp 70. Rather, the actuator 36 may additionally or alternatively include any other structure that enables the actuator 36 to cooperate with the locking ring 28 to release the latch 30 from the latch member 32. Optionally, the actuator 36 is integrally formed with the remainder of the locking segment 64 of the housing 18.

In the exemplary embodiment, the connector 14 terminates the cable 38. The connector 14 includes a cable ferrule 74 that mechanically connects the cable 38 to the housing 18, as can be seen in FIG. 1. The cable 38 is mechanically connected to the locking segment 64 of the housing 18. The cable 38 may also be mechanically connected to the housing 18 through a mechanical connection between the contacts 22 and conductors (not shown) of the cable 38. A combination of the connector 14 and the cable 38 may be referred to herein as a "connector assembly".

The actuator 34 is moveably mounted to the housing 18 of the connector 14. In the exemplary embodiment, the connector 14 includes a collar 76 that extends around the locking ring 28 and around the housing 18. The collar 76 includes the actuator 34. In the exemplary embodiment, the actuator 34 includes an actuator ramp 78 that is configured to cooperate with the locking ring 28 to release the latch 30 from the latch member 32, as will be described below. The actuator ramp 78 is angled obliquely relative to the connection axis 40. The actuator ramp 78 may have any oblique angle relative to the connection axis 40 that enables the actuator ramp 78 to cooperate with the locking ring 28 to release the latch 30 from the latch member 32. The actuator 34 is not limited to the actuator ramp 78, but rather may additionally or alternatively include any other structure that enables the actuator 34 to cooperate with the locking ring 28 to release the latch 30 from the latch member 32.

The collar 76 is moveably mounted to the housing 18 and the locking ring 28. Specifically, the collar 76 is configured to move relative to the housing 18 and relative to the locking ring 28 along the connection axis 40. The collar 76 may include a stop shoulder 80 that limits movement of the collar 76 along the connection axis 40 in the direction of the arrow A. In the exemplary embodiment, and as will be described below, the collar 76 is moved along the connection axis 40, relative to the housing 18, in the direction of the arrow B to release the latch 30 from the latch member 32.

The connector 14 includes the locking ring 28, which extends around the housing 18. The locking ring 28 includes a radially (relative to the connection axis 40) inner side 82 and a radially (relative to the connection axis 40) outer side 84. The locking ring 28 includes the latch 30, which extends along the radially outer side 84 of the locking ring 28. In the exemplary embodiment, the latch 30 includes a latch shoulder 88 that is configured to engage the latch shoulder 56 of the latch member 32 to lock the connectors 12 and 14 together. In the exemplary embodiment, the latch shoulder 88 is angled obliquely relative to the connection axis 40. The latch shoulder 88 may have any angle (whether or not the angle is oblique) relative to the connection axis 40 that enables the latch shoulder 88 to cooperate with the latch member 32 to lock the connectors 12 and 14 together. For example, the angle of the latch shoulder 88 may be approximately perpendicular to the connection axis 40 in other embodiments. The latch 30 is not limited to the latch shoulder 88, but may additionally or alternatively include any other structure that enables the latch 30 to cooperate with the latch member 32 to lock the connectors 12 and 14 together.

The locking ring 28 is configured to be compressed radially (relative to the connection axis 40) inward to release the latch 30 from the latch member 32. Compression of the locking ring 28 is indicated by the arrows C in FIG. 1. The locking ring 28 may include a split (not shown) and/or any other structure that enables the locking ring 28 to compress radially inward. The locking ring 28 is shown in FIG. 1 in a locked position wherein the latch 30 and the latch member 32 cooperate to lock the connectors 12 and 14 together. The locking ring 28 is biased to the locked position. As will be described below, the locking ring 28 can be resiliently compressed radially inward, against the bias, to release the latch 30 from the latch member 32.

The locking ring 28 includes a ring ramp 90 that extends along the radially outer side 84. The ring ramp 90 is configured to cooperate with the actuator ramp 78 of the actuator 34 to release the latch 30 from the latch member 32, as will be described below. The ring ramp 90 is angled obliquely relative to the connection axis 40. The ring ramp 90 may have any oblique angle relative to the connection axis 40 that enables the ring ramp 78 to cooperate with the actuator 34 to release the latch 30 from the latch member 32. The locking ring 28 is not limited to the ring ramp 90, but rather may additionally or alternatively include any other structure that enables the locking ring 28 to cooperate with the actuator 34 to release the latch 30 from the latch member 32. The locking ring 28 may include a stop shoulder 91 that is configured to engage the stop shoulder 80 of the collar 76 to limit movement of the collar 76 along the connection axis 40 in the direction of the arrow A.

The locking ring 28 includes a ring projection 92 that extends inward on the radially inner side 82 of the locking ring 28. The ring projection 92 includes a ring ramp 94 that is configured to cooperate with the actuator ramp 70 of the actuator 36 to release the latch 30 from the latch member 32, as will be described below. The ring ramp 94 is angled obliquely relative to the connection axis 40. The ring ramp 94 may have any oblique angle relative to the connection axis 40 that enables the ring ramp 94 to cooperate with the actuator 36 to release the latch 30 from the latch member 32. Moreover, the locking ring 28 is not limited to the ring projection 92 and/the ring ramp 94. Rather, the locking ring 28 may additionally or alternatively include any other structure that enables the locking ring 28 to cooperate with the actuator 36 to release the latch 30 from the latch member 32.

Figure 2:
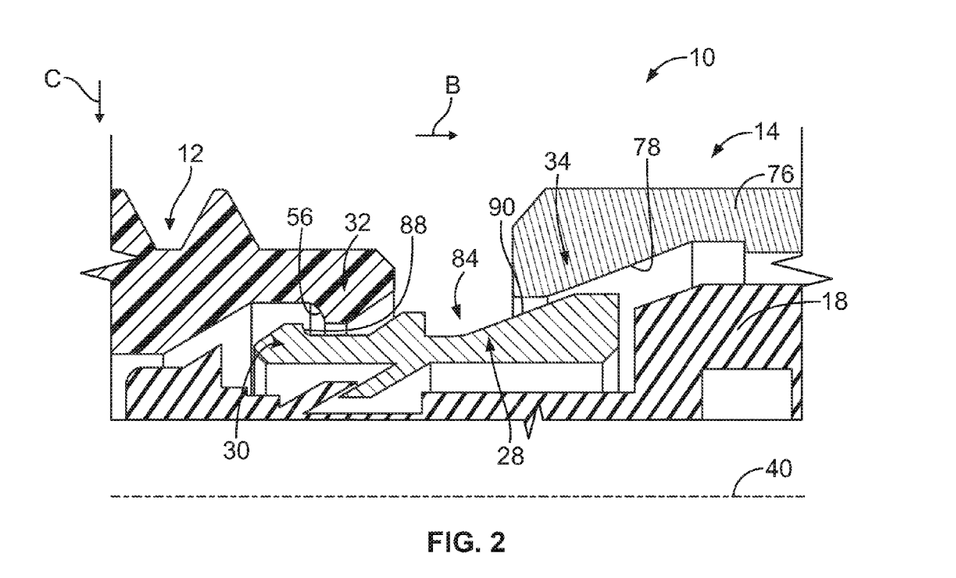
FIG. 2 is an enlarged cross-sectional view of a portion of the connector assembly shown in FIG. 1.

FIG. 2 is an enlarged cross-sectional view of a portion of the connector assembly 10 illustrating use of the collar 76 to unlock the connectors 12 and 14. In FIG. 2, the locking ring 28 is shown in an unlocked position wherein the latch 30 is released from the latch member 32. Referring now to FIGS. 1 and 2, to release the latch 30 from the latch member 32 and thereby unlock the connectors 12 and 14, the collar 76 is moved (e.g., pushed or pulled) along the connection axis 40 in the direction of the arrow B. As the collar 76 moves in the direction B relative to the locking ring 28 and the housing 18, the actuator ramp 78 of the actuator 34 rides along the ring ramp 90 of the locking ring 28. The riding of the actuator ramp 78 along the ring ramp 90 compresses the locking ring radially inward in the direction C until the latch shoulder 88 of the latch 30 clears the latch shoulder 56 of the latch member 32. In other words, the actuator 34 engages the radially outer side 84 of the locking ring 28 to push the locking ring 28 radially inward and thereby release the latch 30 from the latch member 32.

Figure 3:
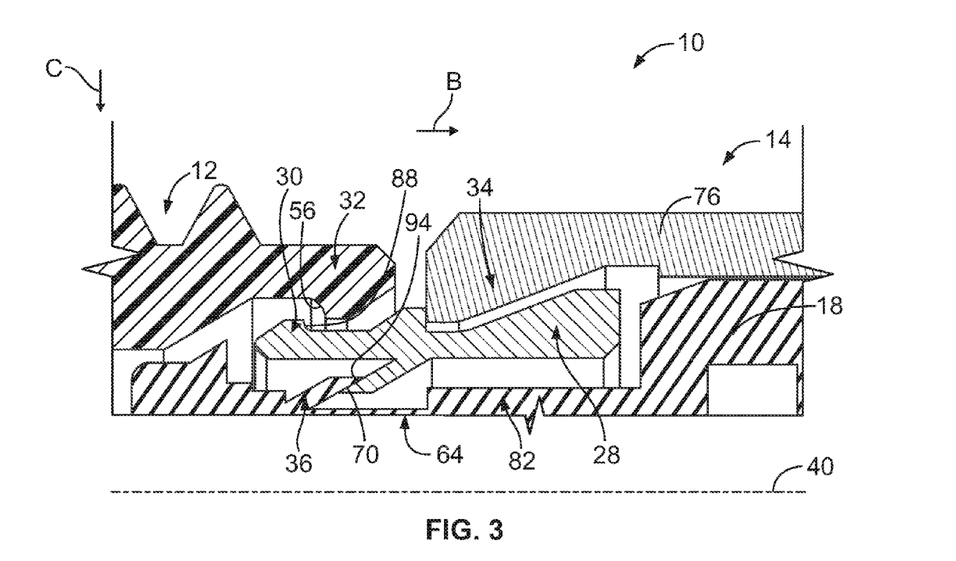
FIG. 3 is another enlarged cross-sectional view of a portion of the connector assembly shown in FIG. 1.

FIG. 3 is another enlarged cross-sectional view of a portion of the connector assembly 10 illustrating use of the actuator 36 to unlock the connectors 12 and 14. Similar to FIG. 2, FIG. 3 illustrates the locking ring 28 in an unlocked position wherein the latch 30 is released from the latch member 32. But, in FIG. 3, the actuator 36 of the housing 18 is used to unlock the connectors 12 and 14 instead of the actuator 34 of the collar 76.

Referring now to FIGS. 1 and 3, to release the latch 30 from the latch member 32 and thereby unlock the connectors 12 and 14 using the actuator 36, the housing 18, the cable ferrule 74, and/or the cable 38 can be moved (e.g., pushed or pulled) along the connection axis 40 and/or along a central longitudinal axis 96 of the cable 38 in the direction of the arrow B. The mechanical connection between the cable 38 and the housing 18 causes the housing 18, including the locking segment 64, to move relative to the locking ring 28 along the connection axis 40 in the direction of the arrow B. The collar 76 may remain stationary relative to the locking ring 28 as the housing 18 moves relative to the locking ring 28 in the direction of the arrow B.

As the housing 18 moves in the direction B relative to the locking ring 28, the actuator ramp 70 of the actuator 36 rides along the ring ramp 94 of the locking ring 28. The riding of the actuator ramp 70 along the ring ramp 94 compresses the locking ring radially inward until the latch shoulder 88 of the latch 30 clears the latch shoulder 56 of the latch member 32. In other words, the actuator 36 engages the radially inner side 82 of the locking ring 28 to pull the locking ring 28 radially inward and thereby release the latch 30 from the latch member 32. Accordingly, the connectors 12 and 14 can be unlocked by pulling or pushing on the housing 18, the cable ferrule 74, and/or the cable 38 in the direction of the arrow B.

As described above, the collar 76 may remain stationary relative to the locking ring 28 as the housing 18 moves relative to the locking ring 28 in the direction of the arrow B. In other words, the actuator 34 does not participate in releasing the latch 30 from the latch member 32 when the actuator 36 is used to unlock the connectors 12 and 14. Accordingly, the actuator 36 is configured to release the latch 30 from the latch member 32, and thereby unlock the connectors 12 and 14, independently of the actuator 34.

The actuators 34 and 36 provide independent alternative means for unlocking the connectors 12 and 14. For example, the collar 76 may be used to unlock the connectors 12 and 14 using the actuator 34, or the actuator 36 may be used to unlock the connectors 12 and 14 by pulling or pushing on the housing 18, the cable ferrule 74, and/or the cable 38 in the direction B. Each of the actuators 34 and 36 may be referred to herein as a "primary actuator" and/or a "secondary actuator". Each of the actuators 34 and 36 may be configured to require a predetermined amount of force to unlock the connectors 12 and 14. Optionally, the actuator 34 requires a greater amount of force to unlock the connectors 12 and 14 as compared to the actuator 36, or vice versa.

The actuator 36 may provide a break-free connector assembly 10. For example, the actuator 36 may be configured to unlock the connectors 12 and 14 when the connectors 12 and 14 experience a disconnection force that may be large enough to cause damage. Accordingly, through the use of the actuator 36, the connectors 12 and 14 may disconnect from each other when exposed to a potentially damaging disconnection force. The actuator 36 may be more reliable, less likely to mechanically fail, and/or less likely to become contaminated with dirt, mud, moisture, dust, corrosion, and/or other debris than that actuators of at least some known break-free connector assemblies. The connectors 12 and 14 may be less likely to vibrate loose, and thereby unintentionally disconnect, from each other than at least some known break-free connector assemblies, for example because of the latching force provided by the locking ring 28.

Although both of the actuators 34 and 36 are described and illustrated herein as unlocking the connectors 12 and 14 by compressing the locking ring 28 radially inward, it should be understood that the reverse arrangement may be used. For example, the latch 30 of the locking ring 28 may extend on the radially inner side 82 of the locking ring 28 and each of the actuators 34 and 36 operates to expand the locking ring 28 radially outward to release the latch 30 from the latch member 32 of the housing 16 and thereby unlock the connectors 12 and 14. In such embodiments, the locking ring 28 is compressed radially inward in the locked position and is resiliently expanded radially outward, against the bias of the locking ring 28 to the locked position, to release the latch 30 from the latch member 32. It should be understood that the relative positions (including relative radial positions) of various components of the connector assembly 10 may be changed as compared to the exemplary embodiment to accommodate embodiments wherein radial expansion of the locking ring 28 releases the latch 30 from the latch member 32, such as, but not limited to, the locking ring 28, the housing 16, the housing 18, the actuator 34, the actuator 36, the latch 30, the latch member 32, the actuator projection 68, the ring projection 92, the actuator ramp 70, the ring ramp 94, the ring ramp 90, the actuator ramp 78, and/or the like. In still other embodiments, the actuator 34 operates to expand the locking ring 28 radially outward to release the latch 30 from the latch member 32 and thereby unlock the connectors 12 and 14, while the actuator 36 operates to compress the locking ring 28 radially inward to release the latch 30 from the latch member 32 (or to release another latch (not shown) from another latch member (not shown)) and thereby unlock the connectors 12 and 14, or vice versa.

Figure 4:
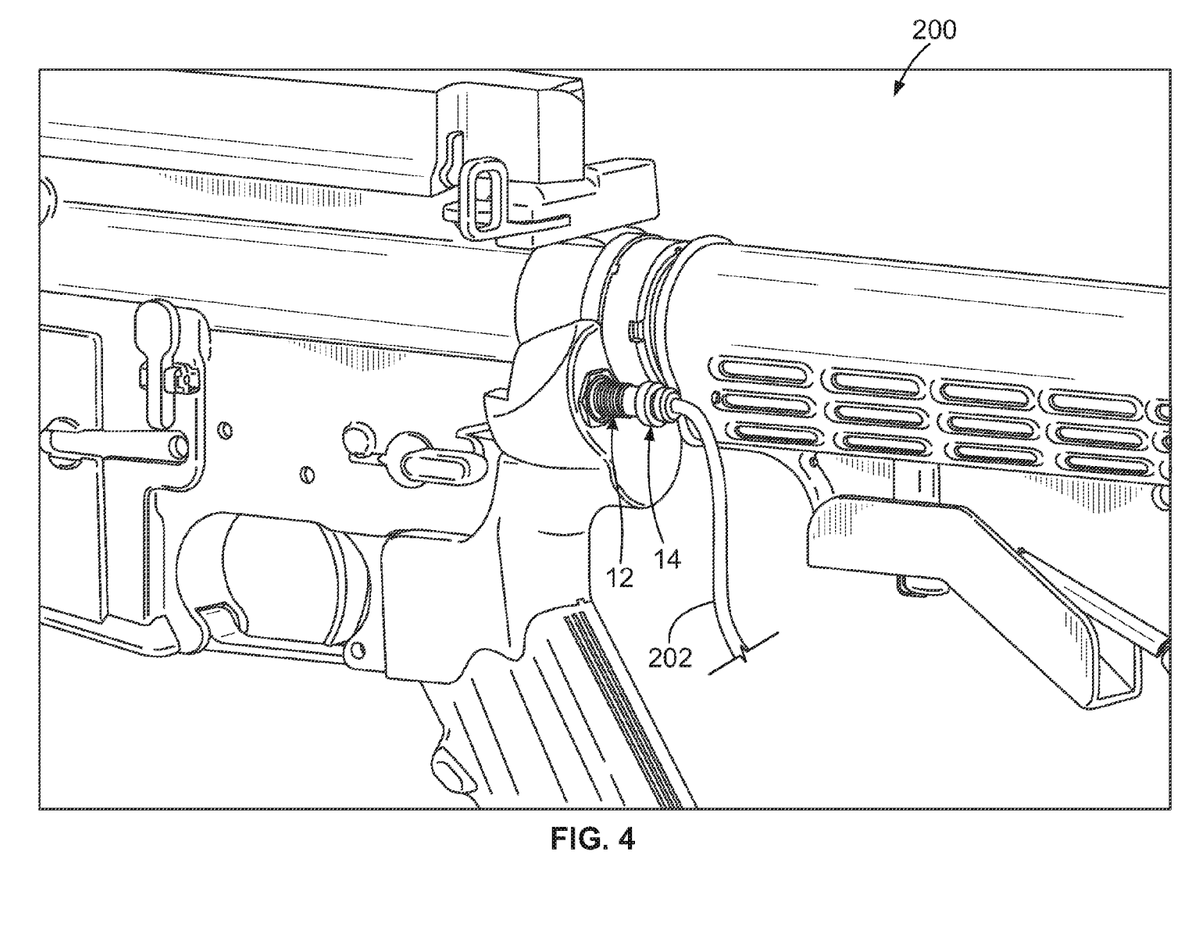
FIG. 4 is a perspective view of a portion of an exemplary embodiment of a weapon with which the connector assembly shown in FIG. 1 may be used.

FIG. 4 is a perspective view of a portion of an exemplary embodiment of a weapon 200 with which the connector assembly 10 may be used. In the exemplary embodiment, the weapon 200 is an AR-15 style weapon, however the weapon 200 is not limited to AR-15 style weapons. Rather, the weapon 200 may be any other type of weapon with which an electrical connector may be used.

The weapon 200 includes electronics (not shown), which may be housed in and/or mounted to any portion of the weapon 200. The weapon 200 includes the connector assembly 10, which electrically connects the electronics of the weapon 200 to an end of a cable 202 that extends from the user of the weapon 200. Data and/or electrical power may be transmitted to and/or from the user and the weapon 200 via the connector assembly 10. The break-free nature of the connector assembly 10 may enable the connectors 12 and 14 to unlock from each other when the cable 202 snags on a wall, a vehicle, and/or another structure, which may facilitate preventing or reducing damage and/or which may facilitate preventing or reducing injury to the user of the weapon 200.

In the exemplary embodiment, the electrical connector 12 is mounted to the weapon 200 while the electrical connector 14 terminates the end of the cable 202. Alternatively, the electrical connector 14 is mounted to the weapon 200 while the electrical connector 12 terminates the end of the cable 202. The connector 12 or 14 that is mounted to the weapon 200 may be mounted to the weapon 200 at any other location(s) along the weapon 200 than the location shown herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A connector for mating with a mating connector, the connector comprising:
   a housing comprising an internal compartment and a locking segment;

a contact held within the internal compartment of the housing;

a locking ring extending around the housing, the locking ring having a latch that is configured to cooperate with a latch member of the mating connector to lock the connector and the mating connector together; and a first actuator being configured to compress the locking ring radially inward or expand the locking ring radially outward to release the latch of the locking ring from the latch member of the mating connector, wherein the locking segment of the housing comprises a second actuator that is configured to compress the locking ring radially inward or expand the locking ring radially outward to release the latch of the locking ring from the latch member of the mating connector.

2. The connector of claim 1, wherein the connector is configured to terminate a cable such that the cable is mechanically connected to the locking segment of the housing, the second actuator being configured to compress the locking ring radially inward or expand the locking ring radially outward when the cable is pulled along a central longitudinal axis of the cable.

3. The connector of claim 1, wherein the locking ring comprises a ring ramp and the second actuator comprises an actuator ramp, the actuator ramp of the second actuator being configured to ride along the ring ramp of the locking ring to compress the locking ring radially inward or expand the locking ring radially outward.

4. The connector of claim 1, wherein the housing extends a length along a central longitudinal axis, the second actuator being slidable along the locking ring in a direction along the central longitudinal axis to compress the locking ring radially inward or expand the locking ring radially outward.

5. The connector of claim 1, wherein the second actuator comprises an actuator projection and the locking ring comprises a ring projection, the actuator projection being configured to slidably engage the ring projection to compress the locking ring radially inward or expand the locking ring radially outward.

6. The connector of claim 1, wherein the locking ring has a radially inner side and an opposite radially outer side, the first actuator being configured to engage the locking ring on the radially outer side to compress the locking ring radially inward or expand the locking ring radially outward, the second actuator being configured to engage the locking ring on the radially inner side to compress the locking ring radially inward or expand the locking ring radially outward.

7. The connector of claim 1, wherein the second actuator is integrally formed with a remainder of the locking segment of the housing.

8. The connector of claim 1, further comprising an insert held within the internal compartment of the housing, the contact being held by the insert, wherein the locking segment of the housing extends around the insert.

9. The connector of claim 1, wherein the locking ring comprises a ring ramp and the first actuator comprises an actuator ramp, the actuator ramp of the first actuator being configured to ride along the ring ramp of the locking ring to compress the locking ring radially inward or expand the locking ring radially outward.

10. The connector of claim 1, wherein the housing extends a length along a central longitudinal axis, the connector further comprising a collar that extends around the locking ring, the collar comprising the first actuator.

11. The connector of claim 1, wherein the housing extends a length along a central longitudinal axis, the connector further comprising a collar that extends around the locking ring, the collar comprising the first actuator, the collar being slidable along the locking ring in a direction along the central longitudinal axis to compress the locking ring radially inward or expand the locking ring radially outward.

12. The connector of claim 1, wherein the first actuator is a primary actuator and the second actuator is a secondary actuator.

13. A connector assembly comprising:
a mating connector having a latch member; and
a connector comprising:
a housing comprising an internal compartment and a locking segment;
a contact held within the internal compartment of the housing;
a locking ring extending around the housing, the locking ring having a latch that is configured to cooperate with the latch member of the mating connector to lock the connector and the mating connector together; and
a first actuator being configured to compress the locking ring radially inward to release the latch of the locking ring from the latch member of the mating connector, wherein the locking segment of the housing comprises a second actuator that is configured to compress the locking ring radially inward to release the latch of the locking ring from the latch member of the mating connector.

14. The connector assembly of claim 13, wherein the connector is configured to terminate a cable such that the cable is mechanically connected to the locking segment of the housing, the second actuator being configured to compress the locking ring radially inward when the cable is pulled along a central longitudinal axis of the cable.

15. The connector assembly of claim 13, wherein the locking ring comprises a ring ramp and the second actuator comprises an actuator ramp, the actuator ramp of the second actuator being configured to ride along the ring ramp of the locking ring to compress the locking ring radially inward.

16. The connector assembly of claim 13, wherein the second actuator comprises an actuator projection and the locking ring comprises a ring projection, the actuator projection being configured to slidably engage the ring projection to compress the locking ring radially inward.

17. The connector assembly of claim 13, wherein the locking ring has a radially inner side and an opposite radially outer side, the first actuator being configured to engage the locking ring on the radially outer side to compress the locking ring radially inward, the second actuator being configured to engage the locking ring on the radially inner side to compress the locking ring radially inward.

18. The connector assembly of claim 13, wherein the housing extends a length along a central longitudinal axis, the connector further comprising a collar that extends around the locking ring, the collar comprising the first actuator.

19. The connector assembly of claim 13, wherein the housing extends a length along a central longitudinal axis, the connector further comprising a collar that extends around the locking ring, the collar comprising the first actuator, the collar being slidable along the locking ring in a direction along the central longitudinal axis to compress the locking ring radially inward.

20. A connector assembly comprising:
a cable extending along a central longitudinal axis, the cable having an end; and
a connector terminating the end of the cable, the connector comprising:

a housing comprising an internal compartment and a locking segment, the locking segment being mechanically connected to the cable;

a contact held within the internal compartment of the housing;

a locking ring extending around the housing, the locking ring having a latch that is configured to cooperate with a latch member of a mating connector to lock the connector and the mating connector together; and a first actuator being configured to compress the locking ring radially inward or expand the locking ring radially outward to release the latch of the locking ring from the latch member of the mating connector, wherein the locking segment of the housing comprises a second actuator that is configured to compress the locking ring radially inward or expand the locking ring radially outward when the cable is pulled along the central longitudinal axis to release the latch of the locking ring from the latch member of the mating connector, the second actuator being configured to release the latch of the locking ring from the latch member of the mating connector independently of the first actuator.

\* \* \* \* \*